J. L. HORN.
Cotton-Planter.
No. 14,240.
Patented Feb. 12, 1856.
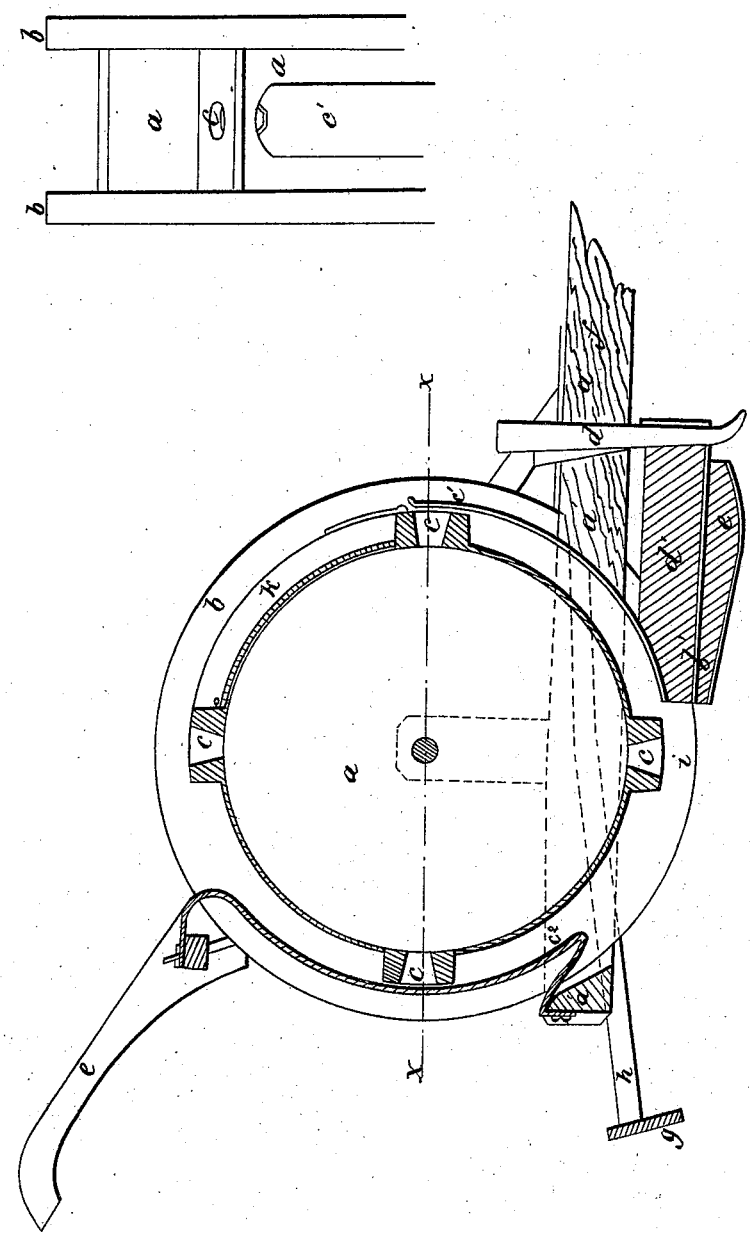

UNITED STATES PATENT OFFICE.

J. L. HORN, OF EDGECOMBE COUNTY, NORTH CAROLINA.

IMPROVEMENT IN COTTON-SEED PLANTERS.

Specification forming part of Letters Patent No. 14,240, dated February 12, 1856.

*To all whom it may concern:*

Be it known that I, J. L. HORN, of Edgecombe county, State of North Carolina, have invented an Improvement in Cotton-Seed Planters; and I do hereby declare that the following is a full, clear, and exact description of the principle or character which distinguishes it from all other things before known, and of the usual manner of making, modifying, and using the same, reference being had to annexed drawings, in which—

Figure 1 represents a vertical middle section through the entire machine; Fig. 2, a detached part of the drum or wheel $a$, showing the flanges $b\ b$, also a part of spring $c'$.

My invention is an improvement in machines for planting cotton-seeds.

From the great bulk and lightness of cotton-seed it is necessary that the receptacle for seed should be large; and to this end I employ a large wheel or drum, $a$, running upon the ground and connected with the frame $a'$. This wheel is provided with flanges $b\ b$, of sufficient height to allow the seed to escape in rear of the opener $b'$. The drum has at suitable intervals conical chargers $c\ c\ c\ c$ for the discharge of the seed. Attached to the frame-work are two metal springs, $c'\ c^2$, for the purpose of closing the apertures when they are below a horizontal line drawn through the axis of the drum, except when they are just in rear of the opener $e$. At that point the chargers are open and the seeds, which in the motion of the drum have been forced into the chargers, drop. As the seeds cannot escape when the apertures are above a horizontal line drawn through the axis of the drum, the pressure of the springs over the chargers is discontinued above that line, so as to save expense and friction. The colter $d$ marks and cuts the drills, which are widened by the opener $e$, which is a V-shaped keel in the center of the shoe piece or check $d'$. This shoe has its under surface broad and flat, so as to run upon the surface, and gages the depth of the drill and also prevents the flanges of the drum from sinking too far in the ground. One of the handles of this machine is shown at $e'$. The shoe-piece $d'$ is attached to the frame and may be, if desired, made adjustable. $f$ is the pole or tongue of the machine. The covering-board $g$ is hinged to the frame by arms $h$ and draws the earth over the drills.

This machine is especially adapted to planting cotton-seed, and is extremely simple and cheap and very efficient in its operation. The object of making the discharge-apertures $c\ c$ conical is to prevent the seeds choking. The drum is opened at the point $k$ or any other convenient place.

I do not claim a distributing-wheel running upon the ground, nor do I claim projecting rims or flanges upon such a distributing-wheel; but I do claim—

The arrangement of the back and front guards, $C'\ C^2$, in combination with the distributing-wheel $a$, provided with the flanges $b\ b$ and chargers $c\ c$, placed at proper intervals, so that no seed can escape below the horizontal line $x\ x$, except at the proper and lowest point, $i$, immediately in rear of the opener $e$.

J. L. HORN.

Witnesses:
T. CAMPBELL,
CHAS. G. PAGE.